(No Model.)
L. BELL.
REGULATOR FOR DYNAMO ELECTRIC MACHINES.
No. 518,218. Patented Apr. 17, 1894.
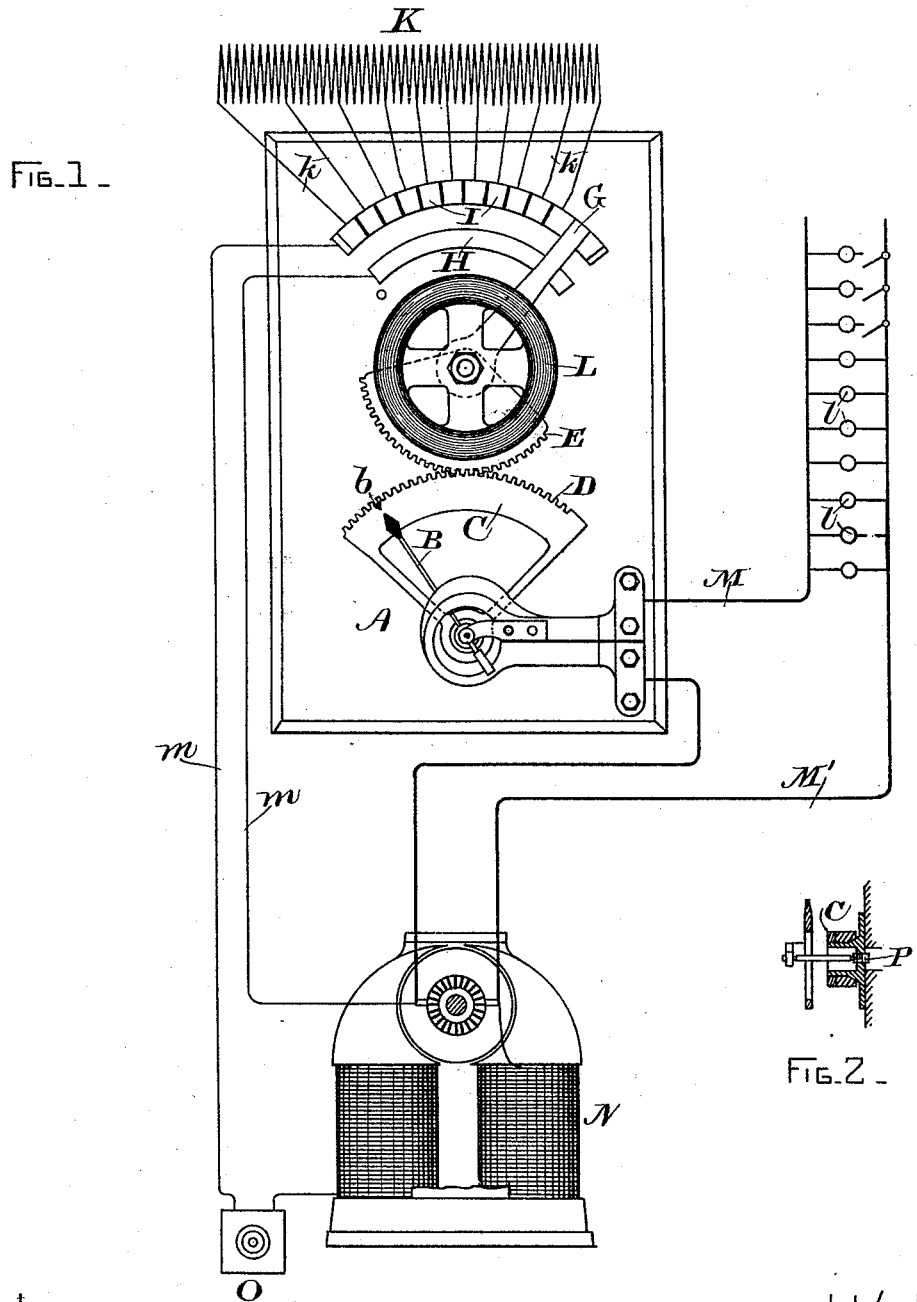

UNITED STATES PATENT OFFICE.

LOUIS BELL, OF BOSTON, MASSACHUSETTS, ASSIGNOR TO THE GENERAL ELECTRIC COMPANY, OF SAME PLACE.

REGULATOR FOR DYNAMO-ELECTRIC MACHINES.

SPECIFICATION forming part of Letters Patent No. 518,218, dated April 17, 1894.

Application filed November 28, 1893. Serial No. 492,248. (No model.)

*To all whom it may concern:*

Be it known that I, LOUIS BELL, a citizen of the United States, and a resident of Boston, in the county of Suffolk, State of Massachusetts, have invented certain new and useful Improvements in Regulators for Dynamo-Electric Machines, of which the following is a specification.

My invention relates to regulators for dynamo-electric machines, and has for its object to provide a combined regulator and current indicator, by means of which I may regulate the potential of the machine in such a manner as to compensate for the drop in voltage of the lines at a distant point. Heretofore it has frequently been the custom to employ pressure wires extending back from a distant point to indicate the voltage at that point.

One of the principal objects of this invention is to dispense with such a pressure wire by enabling the attendant at a station to conveniently compensate for the increased drop due to increased current, by raising the potential of the machine. To this end I arrange my combined indicator and current regulator so that the motion of the arm operating the rheostat for the control of the field will also move the scale of the current indicator or a point of reference movable with respect to the needle of the current indicator; so that when the load on the generator is varied, the same movement which brings this movable point of reference into coincidence with the index of the current indicator will also so vary the field of the generator as to change its potential to suit the particular current indicated.

The accompanying drawings, hereby referred to and made part of this specification, show an embodiment of my invention, wherein—

Figure 1 is a diagrammatic elevation showing my improved apparatus applied to a generator, and Fig. 2 is a detail showing the manner of mounting the scale and index of the current indicator.

A is the current indicator referred to, provided with an index B and a scale C. This scale is provided upon one edge with gear-teeth D, and with an index point $b$, to be kept coincident with the indicator needle; meshing with the gear D is a similar gear E attached to the handle L of the rheostat; this rheostat is of the ordinary construction, provided with a contact-plate H and a series of contact-plates I, over which the arm G of the rheostat moves. The resistance is shown diagrammatically at K; and is provided with suitable leads $k$ to the blocks I.

N is the generator the current of which is controlled by the apparatus described. As illustrated herein, it is shunt-wound, its field-magnets being controlled by the resistance O, and the adjustable resistance K communicating therewith through the lines $m, m$. The armature of the machine delivers its current to the mains M, M' and to the ampère-meter, which is in series in the work circuit supplying the lamps $l, l$.

Referring now to Fig. 2, the method of mounting the needle and scale will be apparent, they being provided with concentric bearings, the needle having the usual pin bearing with a jewel P having an adjusting screw, and the scale having a sleeved bearing concentric therewith. This is an ordinary mechanical device and forms no part of my invention, but is simply illustrated as showing a convenient method of mounting the parts concentrically.

The operation of the device will be readily understood from the foregoing description, and is briefly as follows: When the load on the generator is varied by switching in more or less of the lamps $l, l$ the index B of the current indicator moves away from its old position $b$, indicating an increase in current. The attendant then moves the hand wheel L so as to bring the movable point of reference $b$ again into coincidence with the index B. This same movement moves the rheostat arm G over the blocks I, cutting out more of the resistance K, passing more current through the field and raising the electro-motive force of the machine so as to deliver a greater electro-motive force to the lines M, M', thus compensating for the drop in potential due to the increase in current.

It is to be understood that the arrangement of the parts of the resistance K is arbitrary, and that these parts are to be so proportioned that the movement of the rheostat arm will give the proper amount of resistance for the degree of excitation required by different loads. This may be ascertained by the engineer from the saturation curve of the field-magnets. The same results may also be accomplished by a variable connection, as a cam movement or similar form of eccentric movement, which will vary the throw of the rheostat arm in different portions of its travel, so as to permit the designer to space the resistance equally, but to cause a less movement of the operating handle or wheel L to produce in some parts of its motion a greater movement of the rheostat arm than the same motion produces in other parts of the path of the arm. By making the connection between the current regulator and the indicator adjustable, as by securing the toothed sector of the hand wheel L by means of a set screw, or by using an eccentric adjustably secured to the hand wheel, it is possible for the engineer to make an instrument which is somewhat adjustable, and which might be used upon different generators, or with different degrees of drop compensated for by the same position of the rheostat arm. This adjustability would however be limited to that part of the saturation curve which is regular or approximately vertical in its course, and would not be applicable to the upper part of the curve where it more nearly approaches the horizontal, as in this part of the curve the effect of resistance is quite different from what it is in the straighter or ascending part.

It is evident that such an instrument as I have described may be readily operated by unskilled labor, the sole duty of the attendant being to keep the fiducial point of the scale coincident with the index needle; the resistance being already arranged, and no readings or calculations being necessary on the part of the attendant.

What I claim as new, and desire to secure by Letters Patent of the United States, is—

1. In combination, a rheostat, an electrical measuring instrument, mechanical connections between the rheostat and measuring instruments actuated by the motion of the rheostat arm, and a scale having a point of reference with which the indicator of the measuring instrument should coincide; whereby the motion of the rheostat arm serves to bring into coincidence the scale point of reference and the indicator of the measuring instrument, and at the same time to insert or withdraw a proper resistance, substantially as described.

2. In combination, an ampère meter having a movable scale, a rheostat, and means whereby the movement of the rheostat arm actuates the scale of the ampère meter.

3. In combination, a generator, a rheostat in the field-magnet circuit thereof, an electric measuring instrument in the main circuit, and mechanical connections between the rheostat and the measuring instrument; such connections adapted to cause the withdrawal of resistance varying with the load in the main circuit, as indicated by the measuring instrument.

4. A combined current regulator and indicator comprising a needle movable under the influence of variations of current, a scale movable concentrically with the needle, a rheostat, and means adapted to actuate the rheostat and the scale simultaneously.

5. A combined current regulator and indicator comprising an ampère meter having a movable point of reference, a current regulating appliance, and means substantially as described to simultaneously actuate the current regulator and the point of reference of the ampère meter.

6. In combination, a generator, an ampère meter in the main circuit of such generator, a current regulator in the field-magnet circuit adapted to control its electro-motive force and means whereby the movements of the current regulator may move the point of reference of the ampère meter; all arranged and adapted substantially as herein described, to cause the variations of the ampère meter to indicate a proper resistance proportioned to the load in the circuit and adapted to maintain the excitation of the generator in accordance with such load.

In witness whereof I have hereunto set my hand this 25th day of November, 1893.

LOUIS BELL.

Witnesses:
  A. O. ORNE,
  A. A. McBRIDE.